United States Patent
Corradini et al.

(10) Patent No.: US 10,654,143 B2
(45) Date of Patent: May 19, 2020

(54) GRINDING MACHINE FOR PLATE-LIKE ELEMENTS, PARTICULARLY CERAMIC TILES AND PLATES, NATURAL STONES, GLASS OR SIMILAR

(71) Applicant: ANCORA S.P.A., Sassuolo (Modena) (IT)

(72) Inventors: Mario Corradini, Sassuolo (IT); Antonio Stefani, Sassuolo (IT)

(73) Assignee: ANCORA S.P.A., Sassuolo (Modena) (IT)

( * ) Notice: Subject to any disclaimer, the term of this patent is extended or adjusted under 35 U.S.C. 154(b) by 121 days.

(21) Appl. No.: 15/738,277

(22) PCT Filed: Jun. 22, 2016

(86) PCT No.: PCT/IB2016/053715
§ 371 (c)(1),
(2) Date: Dec. 20, 2017

(87) PCT Pub. No.: WO2016/207814
PCT Pub. Date: Dec. 29, 2016

(65) Prior Publication Data
US 2018/0193969 A1    Jul. 12, 2018

(30) Foreign Application Priority Data

Jun. 23, 2015 (IT) .................. 102015000026896

(51) Int. Cl.
*B24B 7/22* (2006.01)
*B27B 27/10* (2006.01)
(Continued)

(52) U.S. Cl.
CPC .............. *B24B 7/224* (2013.01); *B23Q 3/186* (2013.01); *B24B 7/22* (2013.01); *B24B 7/265* (2013.01);
(Continued)

(58) Field of Classification Search
CPC ........... B24B 7/224; B24B 7/22; B24B 7/265; B24B 9/06; B24B 9/102; B27B 27/10; B23Q 3/186
(Continued)

(56) References Cited

U.S. PATENT DOCUMENTS 1,797,342 A * 3/1931 Hitchcock ............... B24B 9/102
  451/261
2,170,687 A * 8/1939 Johnson ................... B23Q 1/70
  144/134.1
(Continued)

FOREIGN PATENT DOCUMENTS

EP   0504442   9/1992
EP   1338381   8/2003
(Continued)

OTHER PUBLICATIONS

International Search Report for PCT/IB2016/053715 dated Oct. 14, 2016 (3 pages).

*Primary Examiner* — Robert A Rose
(74) *Attorney, Agent, or Firm* — Tutunjian & Bitetto, P.C.

(57) ABSTRACT

The machine for grinding sheet-like elements, particularly tiles and slabs made of ceramic material, natural stone, glass or the like, includes a base framework, means for advancing at least one sheet-like element on a movement plane (A) along an advancement direction (B), the sheet-like element being provided with a pair of opposite first sides to be ground and a front side transversal to the first sides and defining the advancement front of the sheet-like element, means for machining the first sides adapted to intercept the sheet-like element in the motion thereof along the advancement direction (B), means for square-positioning the sheet-like element on the movement plane (A) comprising at least one abutment element which defines at least two support (Continued)

points adapted to contact the front side for arranging it in a position orthogonal to the advancement direction (B).

8 Claims, 7 Drawing Sheets

(51) Int. Cl.
  *B24B 7/26* (2006.01)
  *B24B 9/10* (2006.01)
  *B24B 9/06* (2006.01)
  *B23Q 3/18* (2006.01)
(52) U.S. Cl.
  CPC ............... *B24B 9/06* (2013.01); *B24B 9/102* (2013.01); *B27B 27/10* (2013.01)
(58) Field of Classification Search
  USPC ....................................... 451/5, 44, 267, 262
  See application file for complete search history.

(56) References Cited

U.S. PATENT DOCUMENTS

| | | | | |
|---|---|---|---|---|
| 3,805,455 | A | * | 4/1974 | Aellig ................... B24B 9/102 451/190 |
| 4,228,617 | A | * | 10/1980 | Bando ..................... B24B 9/10 451/270 |
| 6,604,984 | B2 | * | 8/2003 | Gariglio ................ B23Q 1/032 451/41 |
| 7,001,249 | B1 | * | 2/2006 | Pride ..................... B24B 9/102 451/190 |

FOREIGN PATENT DOCUMENTS

| | | |
|---|---|---|
| EP | 1649976 | 4/2006 |
| EP | 2544858 | 9/2014 |
| SU | 783002 | 11/1980 |

* cited by examiner

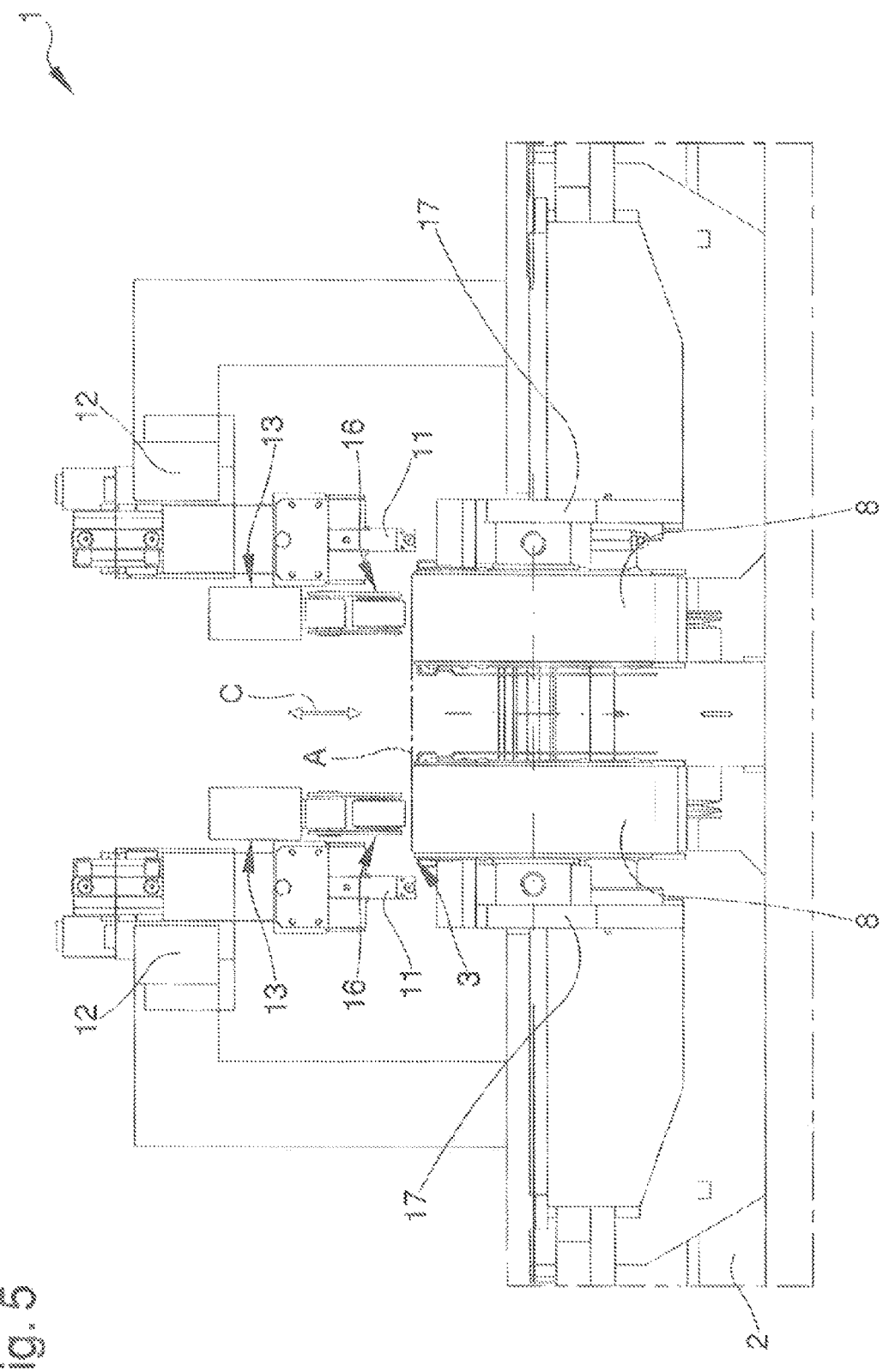

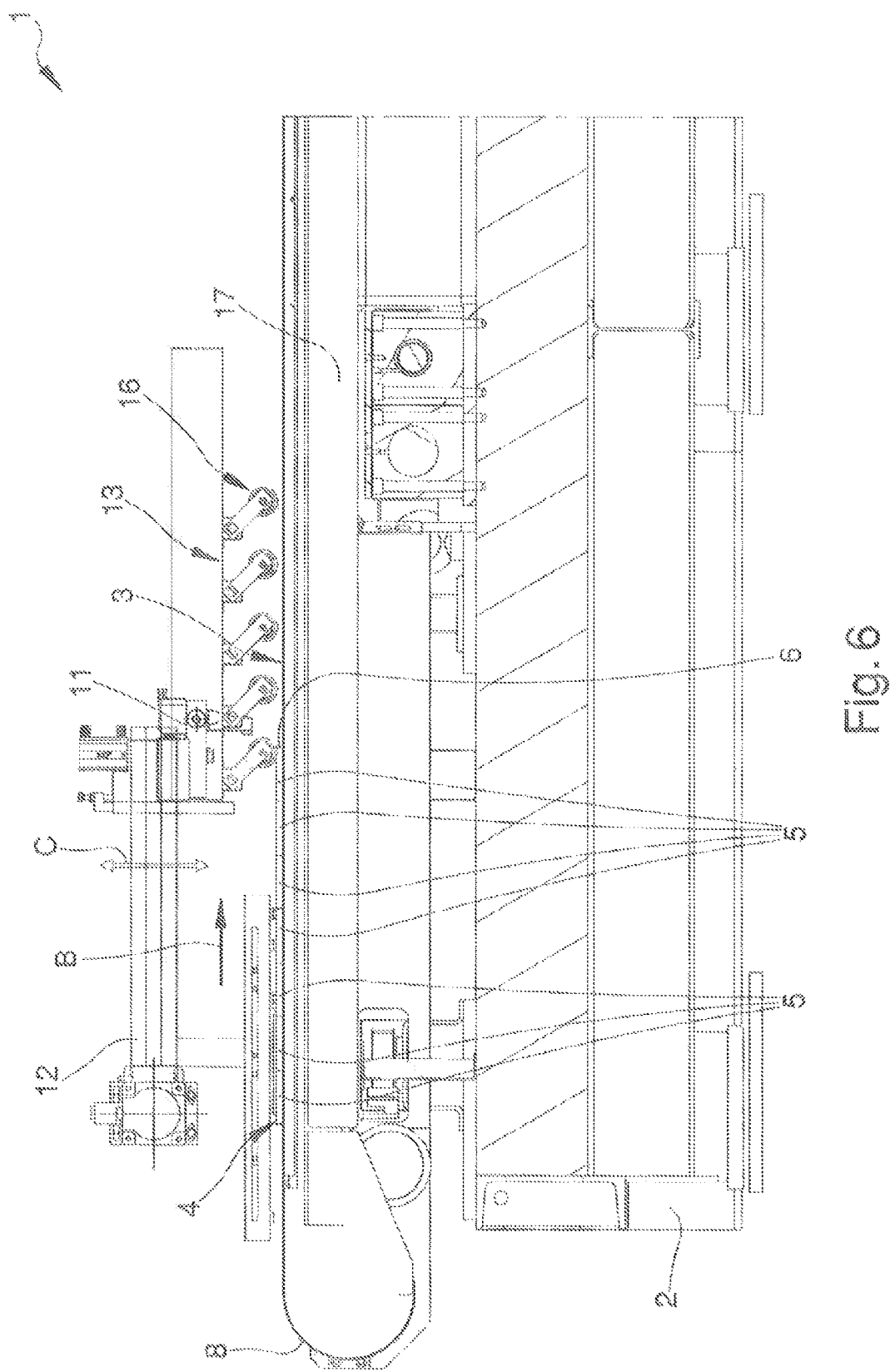

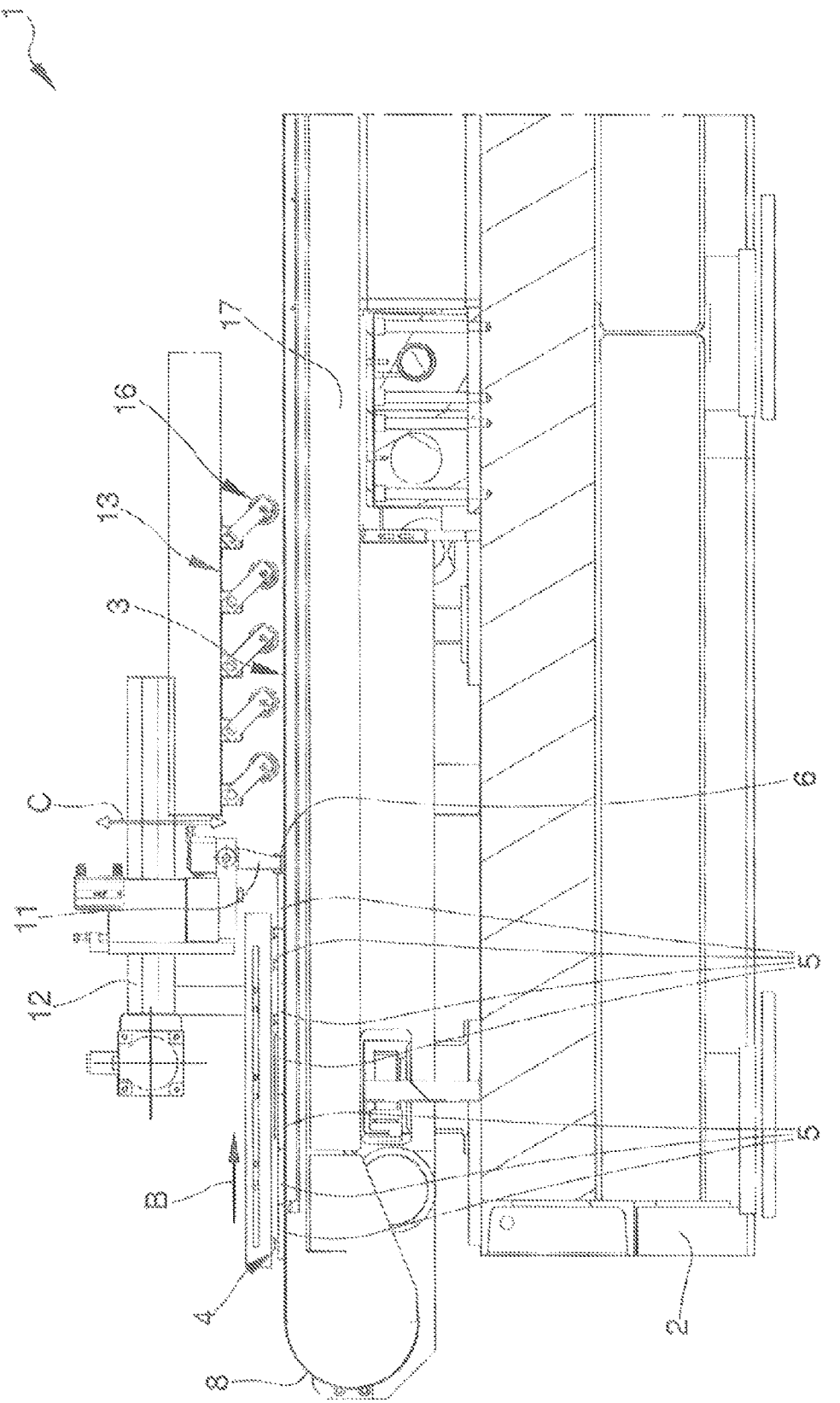

GRINDING MACHINE FOR PLATE-LIKE ELEMENTS, PARTICULARLY CERAMIC TILES AND PLATES, NATURAL STONES, GLASS OR SIMILAR

TECHNICAL FIELD

The present invention regards a machine for grinding sheet-like elements, particularly tiles and slabs made of ceramic material, natural stones, glass or the like.

DESCRIPTION OF RELATED ART

It is known that sheet-like elements like tiles, both flooring and wall tiles, or such as marble and/or glass tiles, require a grinding operation necessary to bring the sides of the products to the ideal design shape or surface.

For example, in the ceramic industry such operation is carried out through grinding machines capable of quickly machining large amounts of ceramic products which advance on a horizontal movement plane in succession.

As a matter of fact, conventional grinding machines usually comprise means, of the conveyor belt type, for advancing sheet-like elements.

The sides of the products to be machined project laterally from the conveyor belts and, during the advancement, they encounter a series of grinding wheels, which remove the surplus material and bring the width of the sheet-like element to the desired value, and possibly one or more inclined wheels for the bevelling operation.

The distance between the wheels and the conveyor belts can be adjusted to set the amount of material to be removed from the products; for this purpose, a manual adjustment device is provided, of the screw type or the like, which can be actuated by an operator.

At the inlet of the machine, a centering device is provided which allows centering the sheet-like elements with respect to a median axis of the movement plane.

Usually, the grinding operations are carried out in two steps: in the first step the sheet-like element is initially centered by means of the centering device and then ground on both sides simultaneously.

In the second step, instead, the other two sides left unfinished in the previous step are ground.

Between the first and the second step, the sheet-like elements encounter square positioning means adapted to position the two sides finished in the first step orthogonally to the advancement direction.

The right-angle positioning means provided for in the conventional machines consist in a carriage which, through an electro-mechanical system, can be moved in an alternating fashion along the advancement direction and which is adapted to contact the rear side of the sheet-like elements.

For such purpose, the carriage supports two abutment elements mounted on special fine adjustment systems, of the screw type or the like, which allow adjusting the depth thereof along the advancement direction.

Thus, once the products enter into the machine, the carriage is automatically actuated towards the sheet-like elements, bringing the abutment elements in contact with the rear side of the products to push them slightly enough to adjust the square position thereof.

An example of a machine for grinding sheet-like elements is described in the patent document No. EP2544858, whose square positioning means comprise a pair of abutment elements simultaneously moveable along the advancement direction and which are adapted to push the rear side of the sheet-like element and position it in the aforementioned square position.

Such square positioning means further comprise linear actuator means adapted to simultaneously actuate abutment elements along the advancement direction.

These machines of the known type reveal some drawbacks.

The machines of the known type are distinguished by the fact that they are rather complex in terms of operational settings as well as ordinary and extraordinary maintenance.

The square positioning means used in conventional machines require frequent adjustments to correct the mutual position of the abutment elements in case of variation of the format of tiles to be ground.

However, such adjustment interventions require stopping the machine for periods of time related to the challenges the user is faced with when intervening on such elements.

Another drawback lies in the fact that each sheet-like element requires to be square-positioned separately and this represents a productivity limitation in the operating line considering how quick the sheet-like elements are fed in sequence.

Lastly, another drawback is related to the fact that there arises the need to operate the abutment elements always at the rear side of the sheet-like elements before the front side nears the machining means.

This requires adjusting the stretch interval of the abutment elements depending on the length of the sheet-like element thus leading to the support structure of the abutment elements being heavy and complex.

EP 1649976 describes another machine according to the prior art.

SUMMARY OF THE INVENTION

The main object of the present invention is to provide a grinding machine, particularly for tiles, ceramic sheet-like elements made of stone or the like, capable of square-positioning the sheet-like elements in a different manner with respect to the machines of the known type, simultaneously guaranteeing a practical and efficient operation.

An object of the present invention is to provide a machine capable of providing a simple construction solution with respect to the machines of the known type.

Still, another object of the present invention is to provide a better performing machine with respect to the machines of the known type and in particular capable of allowing the simultaneous square-positioning of a plurality of sheet-like elements, even small in size, thus increasing productivity and reducing machining times.

Another object of the present invention is to provide a grinding machine capable of overcoming the aforementioned drawbacks of the prior art through a simple and rational solution that is easy to use and relatively inexpensive.

The objects outlined above are attained by the present grinding machine described in the present specification.

BRIEF DESCRIPTION OF THE DRAWINGS

Other characteristics and advantages of the invention shall be more apparent from the description of a preferred but non-exclusive embodiment of a grinding machine, illustrated by way of non-limiting example in the attached drawings, wherein:

FIG. 5 is an axonometric view of a grinding machine according to the invention in a second embodiment;

FIG. 6 is a lateral view of a grinding machine according to the invention in an inoperative configuration and in a second embodiment; and FIG. 7 is a lateral view of a grinding machine according to the invention in an operating configuration and in a second embodiment.

DETAILED DESCRIPTION

Figure 1:
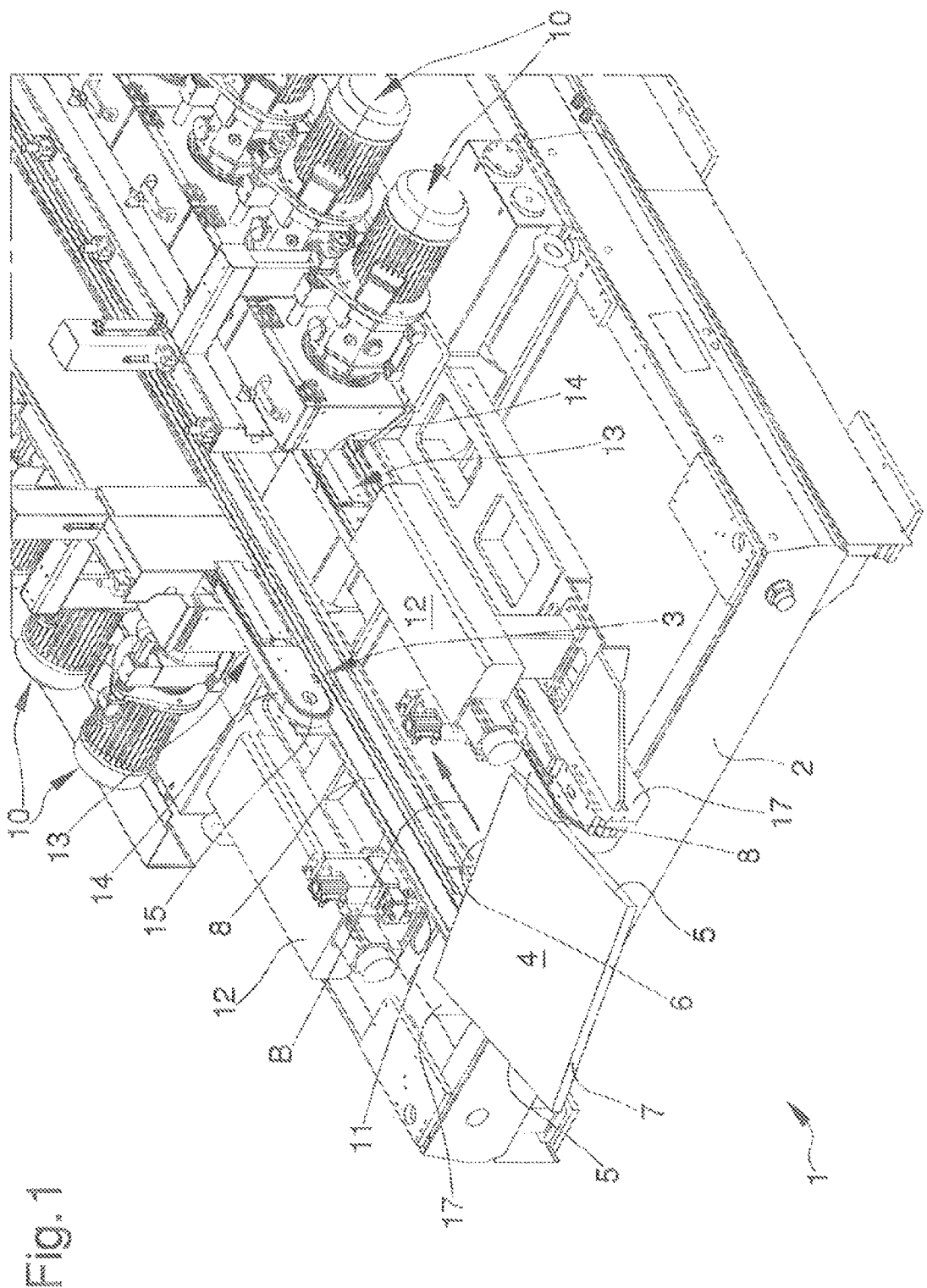
FIG. 1 is an axonometric view of a grinding machine according to the invention in a first embodiment and in a first operating configuration.

With particular reference to such figures, a machine for grinding sheet-like elements, particularly tiles and slabs made of ceramic material, natural stones, glass or the like, is indicated in its entirety with 1.

The machine 1 comprises a base framework 2 for resting on the ground, on which advancement means 3 are mounted for moving at least one sheet-like element 4 on a movement plane A and along at least one advancement direction B.

The sheet-like element 4 is of the ceramic tile type and/or marble or natural stone or glass slab type.

In particular, the sheet-like element 4 is substantially square or rectangular-shaped and it comprises a pair of first sides 5 opposite to each other and to be ground, a front side 6 and a rear side 7, opposed with one another and transversal to the first sides 5.

Generally, both front and rear sides 6, 7 have already been ground.

The expressions front and rear used herein refer to the advancement direction of the sheet-like element 4, thus the front side 6 defines the advancement front of the sheet-like element 4.

More in detail, the advancement means 3 comprise a pair of flexible elements 8 such as belts, conveyors or the like, closed loop-like and at least partly wound around two first advancement pulleys 9.

In particular, the flexible elements 8 can be moved along a direction substantially horizontal and substantially transversal to the advancement direction B.

More in detail, the movement means 3 comprise, for each flexible element 8, a relative support element 17; the support elements 17 are moveable along a direction horizontal and substantially transversal to the advancement direction B, approaching/moving away from each other to adjust the distance between the flexible elements 8 to the change of width of the sheet-like elements 4.

The machine 1 comprises means 10 for machining the first sides 5 which are arranged in proximity of the movement plane A and they are adapted to intercept the sheet-like element 4 in its motion along the advancement direction B.

More in particular, the machining means 10 comprise a plurality of grinding and lateral bevelling wheels, preferably arranged on both sides of the movement plane A and associated to the support elements 17.

In the particular embodiment shown in the figures, the advancement means 3 have a first portion on which the plate-like element 4 is fed and square positioned, and a second portion, arranged downstream of the first portion with respect to the advancement direction B, along which the sheet-like element 4 is held in square position.

More in detail, the advancement means 3 are moved along the advancement direction B by a first electric motor.

The machine 1 comprises means 11 for the square positioning of the sheet-like element 4 on the movement plane A.

According to the invention, the square positioning means 11 comprise at least one abutment element which defines at least two support points different from each other adapted to contact the front side 6, of the sheet-like element 4, to arrange it in a position substantially orthogonal to the advancement direction B.

In the particular embodiment shown in the figures, the square positioning means 11 comprise a pair of abutment elements each defining a relative support point adapted to contact the front side 6.

Preferably, each abutment element 11 is integrally associated to a relative support element 17 so that it can also be movable in a way to approach/move away from each other to automatically adjust to the width of the sheet-like element 4.

The machine 1 comprises means for actuating the abutment elements 11 for example of the electric motor type.

The actuation means are, for example, of the brush-less motor type independent from each other and they provide for actuation in electrical axis for the mutual movement of the abutment elements 11.

More in detail, the abutment elements 11 are moveable between an inoperative position, in which they are arranged outside the trajectory of the sheet-like element 4 in the path thereof along an advancement direction B, and an operative position in which the abutment elements 11 are arranged along the advancement trajectory of the sheet-like element 4 so as to interfere therewith in the path thereof along the advancement direction B.

In the embodiment represented in the figures, the abutment elements 11 are associated moveable in translation to relative guide means 12 along the advancement direction B and they are also moveable in the vertical direction to move from an inoperative position to an operative position and vice versa.

In the particular embodiment shown in the figures, the abutment elements 11 travel at least one travel stretch in the same advancement direction as the sheet-like element 4 at a speed lower than the advancement speed of the sheet-like element.

More in detail, moving at a speed lower than that of the sheet-like element 4, the abutment elements 11 gradually come to contact with the front side 6 thus reducing the risk of breakage.

Figure 2:
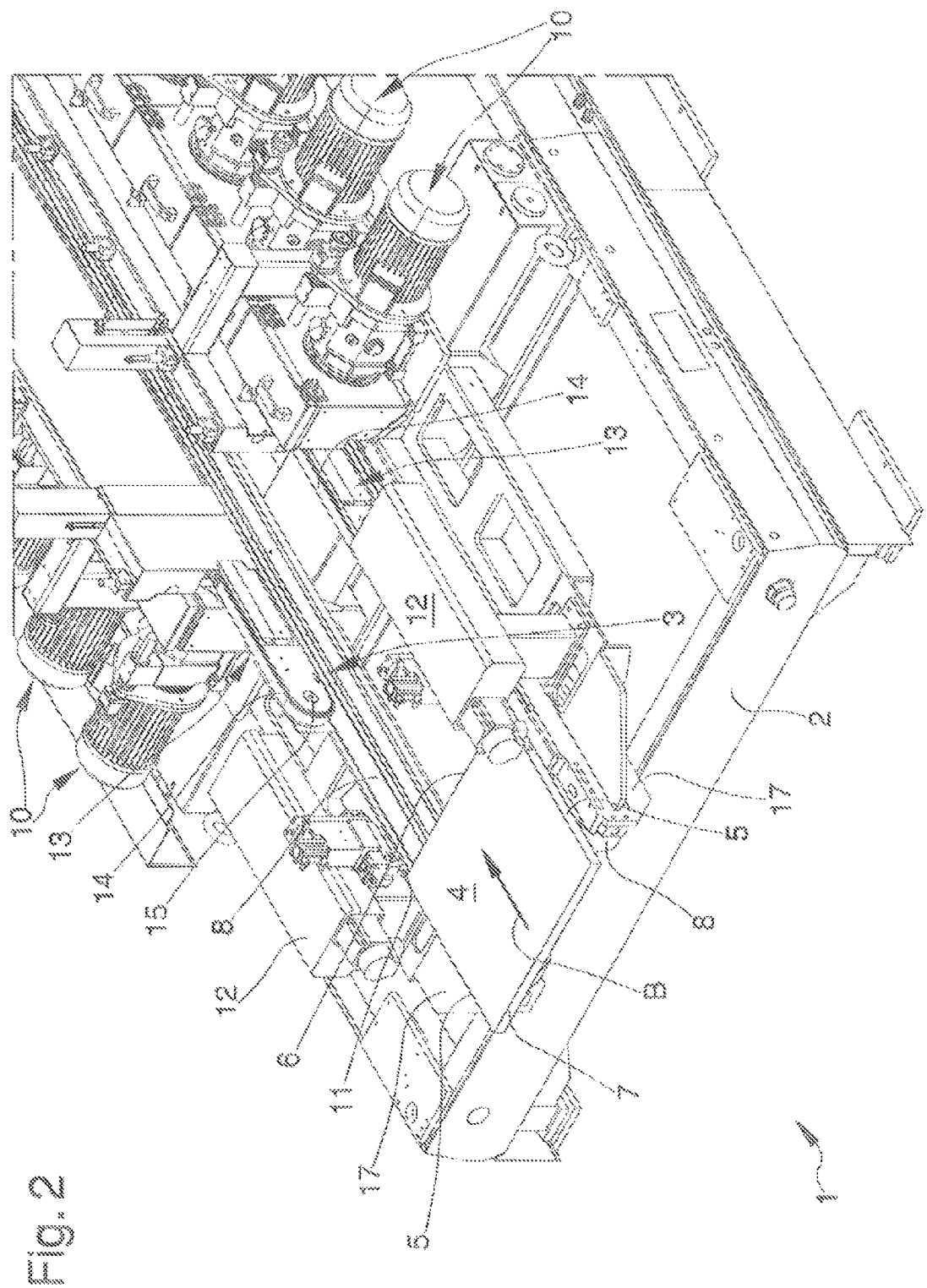
FIG. 2 is an axonometric view of a grinding machine according to the invention in a first embodiment and in a second operating configuration.

FIG. 2 represents the operating condition in which the abutment elements 11 come to contact with the front side 6 of the sheet-like element 4.

Due to the speed difference, the front side 6 contacts both the abutment elements 11, by being positioned orthogonally to the advancement direction B.

In particular, should the front side 6 initially contact only one of the abutment elements 11, this serves as a pin around which the sheet-like element 4 rotates until the front side itself also contacts the other abutment element 11.

During the first travel stretch of the abutment elements 11 it is possible to sequentially feed a plurality of sheet-like elements 4 where, following the square positioning of the front side 6 of the first sheet-like element 4 due to the interaction thereof with the abutment elements 11, the front side 6 of each subsequent sheet-like element 4 rests against the rear side 7 of the sheet-like element preceding it, thus also resting in a square position therewith.

Advantageously, the abutment elements 11 travel at least one second travel stretch, subsequent to the first travel stretch and in the same direction, at a speed higher than the advancement speed of the sheet-like element 4 and along an advancement direction B.

Figure 3:
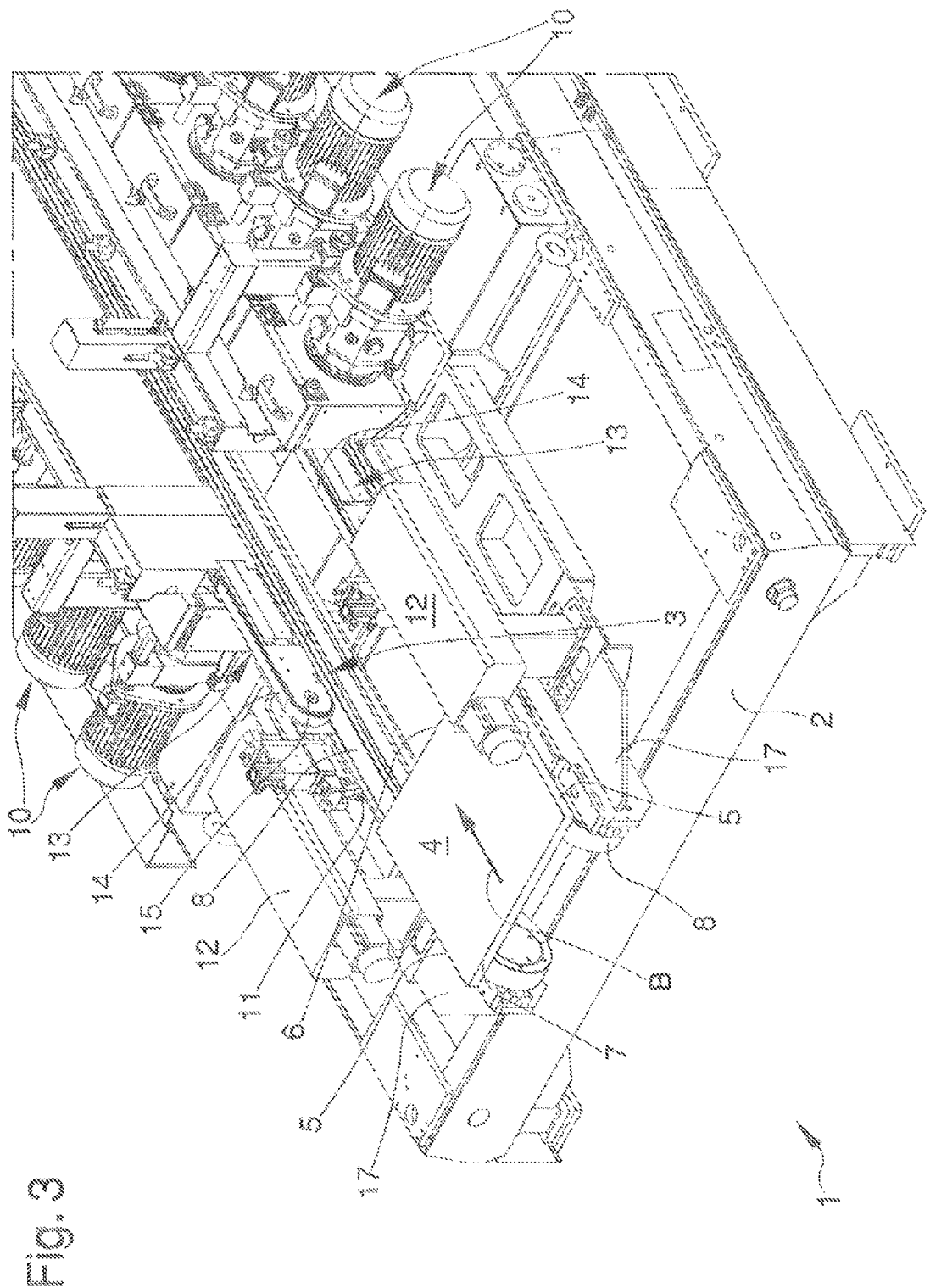
FIG. 3 is an axonometric view of a grinding machine according to the invention in a first embodiment and in a third operating configuration.

FIG. 3 represents the abutment elements 11 spaced from the front side 6 of the sheet-like element 4 following the aforementioned increasing of speed.

More in detail, during the second travel stretch, the abutment elements 11 move away from the front side 6 thus allowing the sheet-like element 4 to continue along the advancement direction B.

Figure 4:
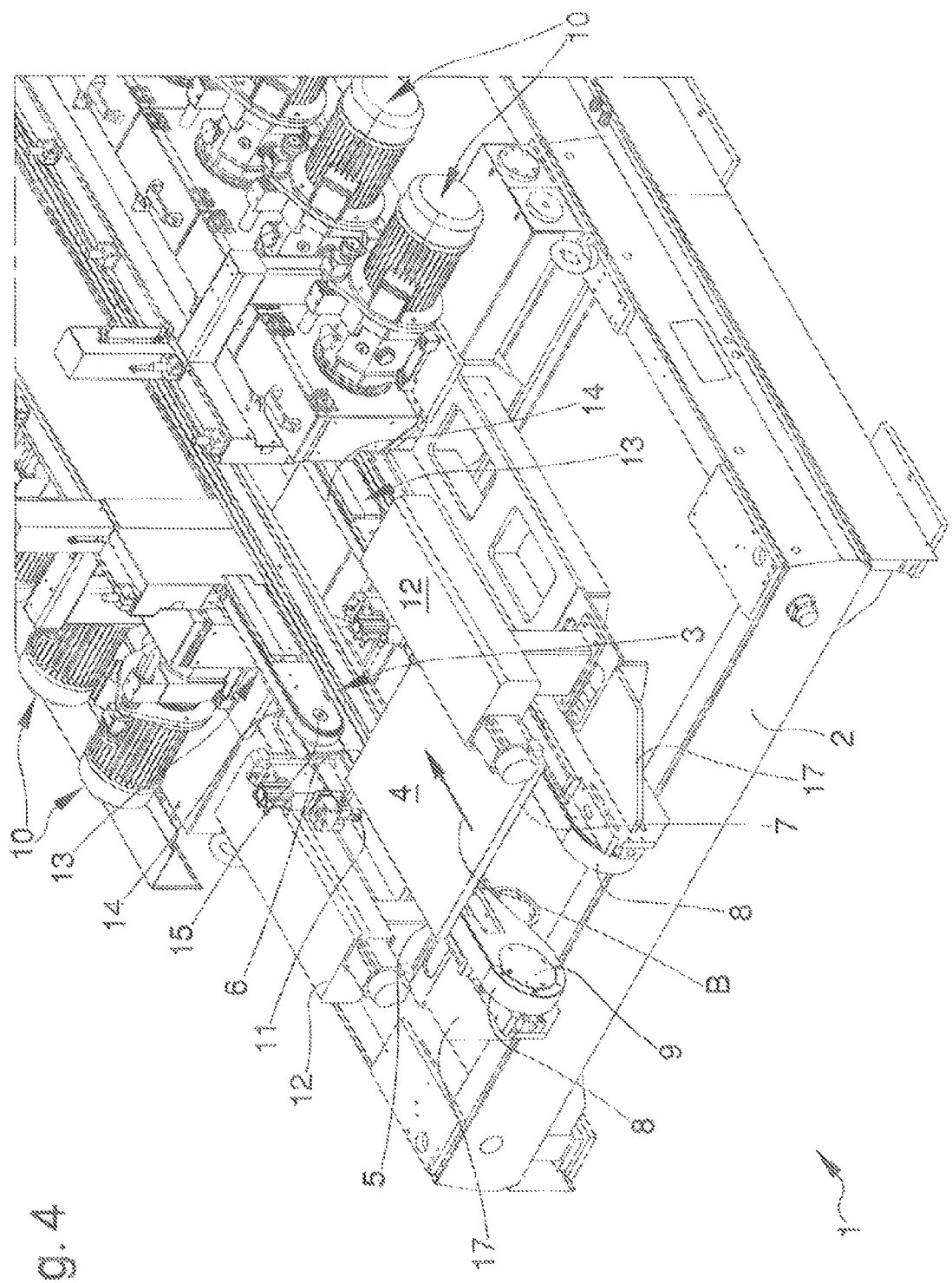
FIG. 4 is an axonometric view of a grinding machine according to the invention in a first embodiment and in a fourth operating configuration.

As shown in FIG. 4, at the end of the second travel stretch, the abutment elements 11 move to the inoperative position so as to allow the sheet-like element 4 to advance along the movement plane A freely.

Lastly, the abutment elements 11 travel a return travel in the opposite direction with respect to the advancement direction B of the sheet-like element 4.

In the particular embodiment shown in the figures, the advancement means 3 comprise pressing means 13 arranged downstream of the abutment elements 11 with respect to the advancement direction B and adapted to hold the sheet-like element 4 in square position.

In particular, the distance of the pressing means 13 from the flexible elements 8 can be adjusted as a function of the thickness of the sheet-like element 4.

In a first embodiment, shown in FIGS. 1 to 4, the pressing means 13 comprise a pair of flexible members 14, such as belts, conveyors or the like, closed loop-like and each of which is at least partly wound around a second actuation pulley 15.

In this first embodiment, the flexible members 14 extend longitudinally with respect to the advancement direction B and they are arranged symmetrically with respect to the vertical plane longitudinal to the advancement direction.

More in detail, the flexible members 14 are arranged above the relative flexible elements 8 and they are adapted to press the sheet-like element 4 against the flexible elements.

Upon reaching the square position of the sheet-like element 4 and following the displacement of the abutment elements 11 from the operative position to the inoperative position, the sheet-like element 4 is inserted between the flexible elements 8 and the flexible members 14.

In a second embodiment, shown in FIGS. 5 to 7, the pressing means 13 comprise a pair of wheel units 16.

More in detail, each wheel unit 16 is arranged above a relative flexible element 8. Similarly, to the first embodiment described above, both wheel units 16 are arranged above the relative flexible elements 8 and they are symmetric with respect to the vertical plane longitudinal to the advancement direction B.

In both embodiments shown in the figures, the pressing means 13 are interposed between the abutment elements 11 along a direction transversal to the advancement direction B.

In other words, the abutment elements 11 are arranged externally with respect to the pressing means 13 to intercept the sheet-like element 4 at the end portions of the front side 6.

The present invention also regards a method for grinding sheet-like elements, particularly tiles and slabs made of ceramic material, natural stone, glass or the like, described below.

In particular, the method comprises:
  a step of providing at least one sheet-like element 4 provided with at least one first side 5 to be ground and at least one front side 6 transversal to the first side 5;
  a step of moving the sheet-like element 4 along an advancement direction B and wherein the front side 6 defines the advancement front of the sheet-like element itself;
  a step of square positioning the sheet-like element 4;
  a step of grinding the first side 5.

According to the invention, the square-positioning is carried out by positioning the front side 6 in a position substantially orthogonal to the advancement direction B.

More in detail, this step is carried out by bringing the front side 6 in contact with two support points substantially mutually aligned along a direction substantially orthogonal to the advancement direction B.

The feeding step may provide for feeding a plurality of sheet-like elements 4 in succession with respect to each other, each of which is provided with a rear side 7 substantially parallel and opposed to the relative front side 6.

By advancing the sheet-like elements 4, the front side 6 of the sheet-like elements 4 subsequent to the first lies against the rear side 7 of the sheet-like element 4 arranged above with reference to the advancement direction B.

In other words, the front side of the sheet-like subsequent elements 4 is arranged against the rear side 7 of the front sheet-like element 4, thus obtaining a series of sheet-like elements 4 arranged consecutively square-positioned with respect to each other.

In this step of square positioning the plurality of sheet-like elements 4, there follows the grinding step which is carried out on the first sides 5 of each of the sheet-like elements 4.

Basically, it has been shown how the described invention attains the pre-set objects and in particular, emphasis is made on the fact that the machine for grinding tiles thus obtained, allows simplifying the square positioning of the tiles with respect to the machines of the known type.

In particular, the square positioning carried out by intervening on the front side not only allows simplifying the structure of the machine and reducing the overall dimensions thereof, but it also provides an alternative with respect to machines known up to date.

Furthermore, the square positioning carried out on the front side of each sheet-like element, allows simultaneously machining a plurality of tiles, thus reducing the frequency of work cycles considering the same number of sheet-like elements machined or increasing the machine productivity considering the same number of work cycles.

In addition, the present invention allows arranging the tiles in square position, regardless of their width, thus guaranteeing quicker operating times and reducing machine shut-down times for machine setting operations carried out by an operator.

The invention claimed is:
1. A machine for grinding sheet-like elements comprising:
  at least one base framework;
  flexible elements for advancing at least one sheet-like element mounted on said base framework and adapted to the movement of said at least one sheet-like element on at least one movement plane (A) along at least one advancement direction (B), said sheet-like element being provided with a pair of first opposite sides to be ground and at least one front side transversal to said first sides and defining the advancement front of the at least one sheet-like element;

wheels for machining said first sides which are arranged in proximity of said movement plane (A) and they are adapted to intercept said sheet-like element in its motion along said advancement direction (B);

at least one abutment element for square-positioning said sheet-like element on said movement plane (A);

wherein said at least one abutment element defines at least two support points different from each other and adapted to contact said front side for arranging it in a position substantially orthogonal to said advancement direction (B), and wherein said at least one abutment element is moveable along said advancement direction (B).

2. The machine according to claim 1, further comprising a pair of said abutment elements, each of which defining a relative support point.

3. The machine according to claim 1, wherein said at least one abutment element is moveable between an inoperative position, in which said at least one abutment element is arranged outside the trajectory of said sheet-like element in the path thereof along said advancement direction (B), and an operative position, in which it is arranged along the trajectory of advancement of said sheet-like element so as to interfere therewith in the path thereof along said advancement direction (B).

4. The machine according to claim 1, wherein said at least one abutment element travels at least one first travel stretch in the same direction of advancement of the sheet-like element at a speed lower than the speed of the sheet-like element itself.

5. The machine according to claim 4, wherein said at least one abutment element travels a second travel stretch, subsequent to said first stretch and in the same direction, at a speed higher than the speed of advancement of said sheet-like element.

6. The machine according to claim 5, wherein said at least one abutment element moves to an inoperative position at the end of said second stretch.

7. The machine according to claim 1, wherein said at least one abutment element travels a return travel in the opposite direction with respect to the advancement direction (B) of said sheet-like element.

8. A method for grinding sheet-like elements comprising the following steps:

providing at least one sheet-like element provided with at least one first side to be ground and at least one front side transversal to said first side;

moving said sheet-like element along an advancement direction (B), said front side defining the advancement front of the sheet-like element;

square-positioning said sheet-like element;

grinding said first side;

wherein said square-positioning is carried out by positioning said front side in a position substantially orthogonal to said advancement direction (B); and wherein said step of moving comprises feeding a plurality of sheet-like elements in succession with respect to each other, each of which is provided with a rear side substantially parallel and opposed to the relative front side, in that said square-positioning is carried out by positioning said front side of the first of said sheet-like elements in a position substantially orthogonal to said advancement direction (B), the front side of the subsequent sheet-like elements resting against the rear side of the sheet-like elements preceding them, said grinding being carried out on said first sides of each of said sheet-like elements.

* * * * *